US006192377B1

United States Patent
Ganesh et al.

(10) Patent No.: US 6,192,377 B1
(45) Date of Patent: Feb. 20, 2001

(54) METHOD AND APPARATUS FOR DETERMING WHETHER A TRANSACTION CAN USE A VERSION OF A DATA ITEM

(75) Inventors: Amit Ganesh, Mountain View; Gary C. Ngai, Saratoga, both of CA (US)

(73) Assignee: Oracle Corporation, Redwood Shores, CA (US)

(*) Notice: Under 35 U.S.C. 154(b), the term of this patent shall be extended for 0 days.

(21) Appl. No.: 09/078,358

(22) Filed: May 13, 1998

(51) Int. Cl.[7] ................................................. G06F 17/30
(52) U.S. Cl. .................. 707/203; 707/511; 707/906; 714/1; 714/2
(58) Field of Search ...................... 707/203, 511, 707/906, 202, 201; 714/1, 2

(56) References Cited

U.S. PATENT DOCUMENTS

| 5,287,496 | * | 2/1994 | Chen et al. ............................ 707/203 |
| 5,778,388 | * | 7/1998 | Kawamura et al. ................... 707/203 |
| 5,857,205 | * | 1/1999 | Roth ..................................... 707/203 |
| 5,873,098 | * | 2/1999 | Bamford et al. ...................... 707/203 |
| 5,893,113 | * | 4/1999 | McGrath et al. ..................... 707/200 |
| 5,893,117 | * | 4/1999 | Wang .................................... 707/203 |
| 5,907,848 | * | 5/1999 | Zaiken et al. ........................ 707/202 |
| 5,920,725 | * | 7/1999 | Ma et al. .............................. 395/712 |
| 5,946,689 | * | 8/1999 | Yanaka et al. ........................ 707/10 |
| 5,956,713 | * | 9/1999 | Bamford .............................. 707/8 |
| 5,956,731 | * | 9/1999 | Bamford et al. ..................... 707/201 |

* cited by examiner

Primary Examiner—Hosain T. Alam
Assistant Examiner—Jean Bolte Fleurantin
(74) Attorney, Agent, or Firm—Hickman Palermo Truong & Becker LLP; Edward A Becker; Brian D. Hickman (57) ABSTRACT

A method and an apparatus for determining whether a transaction can use a version of a data item is provided. Transaction summary data is generated that is associated with one or more transactions that have updated a version of the data item. The transaction summary data specifies both a data buffer refresh time and a data buffer commit time. The data buffer refresh time is indicative of the latest time at which the version of data is guaranteed to be current. The data buffer commit time is indicative of the commit time of a most recently committed transaction from the one or more transactions that committed after updating the version of the data item. A determination is made, based upon the transaction summary data and a snapshot time used by the first transaction, whether the version of the data item is to be provided to the first transaction. The data buffer commit time is updated to reflect the commit time of other transactions that commit after updating the version of the data item.

25 Claims, 3 Drawing Sheets

METHOD AND APPARATUS FOR DETERMINING WHETHER A TRANSACTION CAN USE A VERSION OF A DATA ITEM

FIELD OF THE INVENTION

The present invention relates to database systems, and more specifically, to a method and apparatus for determining whether a transaction in a database system can use a version of a data item.

BACKGROUND OF THE INVENTION

In typical database systems, users store, update and retrieve information by submitting commands to a database application. To be correctly processed by the database application, the commands must comply with the database language that is supported by the database application. One popular database language is known as Structured Query Language (SQL).

In the context of database systems, a transaction is a logical unit of work that is comprised of one or more database language statements. When a database system executes a transaction, the transaction may read or update a data item that was written or updated in response to the execution of previous transactions. Consequently, the results returned by the database system in response to executing any given transaction are typically dictated by changes made by a set of previously executed transactions. The term "data item" is used herein to refer to any logical data type. An example of a logical data type is a row in a database, where a row is an exclusive set of one or more associated data elements.

In contemporary database systems, copies of data items contained in the database are often stored in a volatile memory which requires less time to access than non-volatile memory to improve transaction processing performance. Different versions of the data item are reconstructed by applying one or more undo records to the copies of the data item. Sometimes, multiple copies of a data item in the database are maintained in volatile memory so that concurrently executing transactions can simultaneously access different versions of the data item.

Because each transaction must see a database in a consistent state when it begins executing and must also leave the database in a consistent state when it completes processing, not all versions of a data item can necessarily be used by a transaction. Some versions of a data item may not contain updates which must be seen by a transaction for that transaction to see a consistent view of that data item. On the other hand, other versions of the data item may contain updates which cannot be seen by the transaction. Hence, in situations where multiple versions of a data item are available to transactions, access to the versions of a data item by transactions must be managed so that database consistency is maintained.

One approach for managing the execution of transactions to maintain database consistency involves processing transactions in what is referred to herein as "Consistent Read Mode". Consistent Read Mode is characterized by two rules. First, every statement executed by a Consistent Read Mode transaction sees only (1) changes that were committed to the database by a particular set of committed transactions and (2) changes made by prior statements of the transaction itself. The set of transactions whose changes are visible to a statement is referred to as the statement's "snapshot set." The ability to execute transactions in consistent read mode allows transactions that are issuing reads to be isolated from the changes made by excluded transactions that are concurrently issuing writes. Second, an updating transaction locks the rows it writes, and holds those locks until it commits. A lock on any given row may be held by only one transaction at a time. A row, as the term is used herein, refers to an exclusive set of one or more associated data elements.

A Consistent Read Mode transaction requires that statements see a "snapshot" of the database. A statement's snapshot includes all changes made by the transactions in its snapshot set, and none of the changes made by any transactions that are not in its snapshot set ("excluded transactions"). Transactions are sometimes assigned a snapshot time that corresponds to the state of a database at the time the transaction began executing. For consistent read, a transaction must see all changes made to a database by transactions that committed on or before the snapshot time of the transaction.

The concept of consistent read is described in more detail in U.S. patent application Ser. No. 08/842,169, entitled "SHARING SNAPSHOTS FOR CONSISTENT READS," filed on Apr. 23, 1997, U.S. patent application Ser. No. 08/838, 967, entitled "TECHNIQUES FOR REDUCING THE NUMBER OF SNAPSHOTS OF A DATABASE," filed on Apr. 23, 1997, and U.S. patent application Ser. No. 08/841,541, entitled "DYNAMIC SNAPSHOT SET ADJUSTMENT," filed on Apr. 23, 1997, the contents of each of which are incorporated herein by reference.

As a simple example, suppose a transaction requires access to a version of a data block as it existed at time T15 (i.e. the snapshot time of the transaction is T15). The transaction must be supplied a version of the data block that contains all changes made by transactions that committed on or before time T15, but no changes made by transactions that committed after time T15. Versions of the data block that include updates made by transactions that have not yet committed (except for the requesting transaction itself), or committed after time T15, cannot be used.

INCLUDE AND EXCLUDE TIMES

In some database systems, prior versions of a data block are reconstructed to allow a transaction to see a particular state of a database. For example, sometimes a prior version of a data block is reconstructed by applying undo records to remove changes made by another transaction. To support the reconstruction of prior versions of a data block, some database systems maintain an INCLUDE TIME and an EXCLUDE TIME for each version of a data block. The INCLUDE TIME specifies the commit time of the most recently committed transaction whose changes are included in the version of the data block. The EXCLUDE TIME specifies the commit time of the oldest transaction whose changes have been removed from the version of the data block. If a particular version of a data block is the most recent version of the data block, then the EXCLUDE TIME for that version is infinity, since no changes have been removed.

For example, suppose a first transaction causes a copy of a data block to be loaded into a volatile memory, updates the copy of the data block to create a new version (the "first version") of the data block, and then commits at time T10. The INCLUDE TIME for this first version is set to time T10 and the EXCLUDE TIME is set to infinity. Then a second transaction updates the same copy of the data block to create a second version of the data block and commits at time T30. The INCLUDE TIME of the second version of the data block is changed to time T30 to reflect that the second version of the data block includes changes made by a transaction that committed at time T30, while the EXCLUDE TIME remains at infinity, since no changes have been removed from the second version of the data block. Any transaction having a snapshot time that is greater than or equal to the INCLUDE TIME of T30, can be supplied this second version of the data block because it contains all changes to the data block made by all transactions that committed at a time up to and including time T30.

Now suppose that a third transaction requires access to the data block as of time T20. The second version of the data block cannot be used in its current state because it contains an update made by the second transaction that committed at time T30. Therefore, the first version of the data block is reconstructed by removing the change made by the second transaction. Once the reconstruction operation is completed, the INCLUDE TIME of the new copy is changed to time T10, and the EXCLUDE TIME is changed to time T30, to reflect that this version of the data block contains the changes made by the first transaction that committed at time T10, and that the changes made by the second transaction, that committed at time T30, have been removed. Thus, any transaction that requires access to the data block as it existed from time T10 up to, but not including time T30, can use this reconstructed first version of the data block.

MUST SEE AND CANNOT SEE TIMES

Instead of a single snapshot time for a transaction, some database systems use MUST SEE and CANNOT SEE times to define a dependency range for each transaction, which can provide more flexibility in selecting a convenient version to read. According to this approach, a transaction must see changes made by any transaction that has a commit time at or earlier than the MUST SEE time. In addition, the transaction cannot see changes made by any transaction having a commit time at or later than the CANNOT SEE time. The concept of MUST SEE and CANNOT SEE time is described in more detail in the applications incorporated by reference as described above.

When used in conjunction with INCLUDE and EXCLUDE times for a version of a data block, two conditions must be satisfied for a given transaction to be able to use a version of a data block. First, the CANNOT SEE time of the given transaction must be greater than the INCLUDE TIME of the version of the data block. In other words, the most recent transaction whose changes are reflected in the version of the data block must have committed before the CANNOT SEE time of the given transaction. Second, the MUST SEE time of the given transaction must be less than the EXCLUDE TIME of the version of the data block. In other words, changes that must be seen by the given transaction cannot have been removed from the version of the data block.

For example, suppose a particular version of a data block has an INCLUDE TIME of T33 and an EXCLUDE TIME of T39. A transaction having a MUST SEE time of T30 and a CANNOT SEE time of T40 requests access to the data block. Since the INCLUDE TIME is less than the CANNOT SEE time and the EXCLUDE TIME is greater than the MUST SEE time, the particular version of the data block can be supplied to this transaction.

Once the transaction has read the particular version of the data block, the MUST SEE and CANNOT SEE values are updated to reflect the particular version of the data block just read, because if the transaction sees one of the changes made by another transaction, it must see all of the changes made by that other transaction. Accordingly, the MUST SEE time for the transaction is changed from time T30 to time T33 (the greater of the current MUST SEE time in the INCLUDE TIME) since the particular version of the data block includes changes as of time T33. In addition, now that the transaction has read data from which changes had been removed by a transaction that committed at time T39, the transaction cannot see any changes made to any data as of time T39 or later. Accordingly, the CANNOT SEE time for the given transaction is changed from time T40 to time T39.

MAINTAINING TRANSACTION DATA

Any approach for managing the access of transactions to versions of data blocks necessarily involves evaluating changes made to versions of the data blocks to determine whether any of those versions can be used by a transaction. One approach involves maintaining for each version of a data block a list of records that specifies any transactions that have modified that version of the data block. When a transaction requires access to the data block, the lists of records for the various versions are examined to determine whether the transaction can use any of the versions. If the list of records for a particular version of a data block indicates that the version includes changes made by transactions that have not yet committed, or includes changes made by transactions that committed after the time at which the transaction requires access to the data block, then that version of the data block cannot be used by the transaction. In addition, if the list of records for a particular version of a data block indicates that the version does not include changes that must be seen by the transaction, then that version of the data block cannot be used by the transaction.

The lists of records are sometimes in the form of a transaction list that includes information about transactions that have updated a version of a data block. Each entry corresponds to an update and includes an index number, a transaction ID associated with the transaction that made the update, a status flag that indicates the status of the transaction that updated the data block, a snapshot number for the transaction that updated the data block, as well as other information pertaining to the update.

Thus, to determine whether a version of a data block can be used by a transaction, the entries in the transaction list for the version of the data block are inspected. In situations where transaction lists are stored in a non-volatile memory such as a disk, a large amount of system resources and time can be required to inspect all of the transaction list entries because of the relatively slow access times for non-volatile storage devices. Moreover, the amount of time required to inspect the entries in the transaction lists is dependent upon the number of entries in the transaction lists. In some database systems, this may require a large number of entries to be inspected. Thus, the approach of examining entries in transaction lists to determine whether a transaction can use a particular version of a data block can require a large amount of system resources and time and is dependent upon the number of transaction list entries that must be inspected.

Based on the need to determine whether a transaction can use a particular version of a data block and the limitations in the prior approaches, an approach for determining whether a transaction in a database system can use a particular version of a data block, that requires relatively fewer system resources than prior approaches, is highly desirable.

SUMMARY OF THE INVENTION

According to one aspect of the invention, a method is provided for determining whether a version of data should be provided to a transaction. The method comprises the steps of generating transaction data associated with one or more transactions that have updated the version of data, the transaction data indicating commit times of the one or more transactions that have committed after updating the version of data, generating transaction summary data based upon the transaction data, the transaction summary data indicating a latest time at which the version of data is guaranteed to be current, the transaction summary data further indicating a commit time of a most recently committed transaction of the one or more transactions that committed after updating the version of data and determining, based upon the transaction summary data and a snapshot time used by the transaction, whether the version of data is to be provided to the transaction.

According to another aspect of the invention, a computer system is provided for determining whether a version of data should be provided to a transaction. The computer system comprises one or more processors and a memory coupled to the one or more processors. The memory contains one or more sequences of one or more instructions which, when executed by the one or more processors, cause the one or more processors to perform the steps of generating transaction data associated with one or more transactions that have updated the version of data, the transaction data indicating commit times of the one or more transactions that have committed after updating the version of data, generating transaction summary data based upon the transaction data, the transaction summary data indicating a latest time at which the version of data is guaranteed to be current, the transaction summary data further indicating a commit time of a most recently committed transaction of the one or more transactions that committed after updating the version of data and determining, based upon the transaction summary data and a snapshot time used by the transaction, whether the version of data is to be provided to the transaction.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE PREFERRED EMBODIMENT

In the following description, for the purposes of explanation, specific details are set forth in order to provide a thorough understanding of the invention. However, it will be apparent that the invention may be practiced without these specific details. In other instances, well-known structures and devices are depicted in block diagram form in order to avoid unnecessarily obscuring the invention.

FUNCTIONAL OVERVIEW

In general, an approach for determining whether a transaction in a database system can use a copy of data is provided. The approach involves generating transaction summary data for the copy of data that is operated on by transactions. The transaction summary data specifies: (1) a data buffer refresh time; (2) a data buffer commit time and (3) an active transaction flag. All changes made prior to the data buffer refresh time are reflected in the copy of data associated with the transaction summary data that contains the data buffer refresh time. The data buffer commit time is the commit time of the most recently committed transaction that updated the copy of data. As transactions that operate on the copy of data commit, the data buffer commit time is incrementally updated to reflect that those transactions have committed. The active transaction flag indicates whether, at the time the copy of data was created, any transactions had operated on the data and were still active (not yet committed).

To determine whether a transaction can use a particular copy of data, the transaction summary data associated with the particular copy of data is evaluated against the time at which the transaction has requested to see the data. Using transaction summary data to determine whether a transaction can use a particular copy of data requires relatively fewer system resources than other approaches, such as those that require the examination of transaction lists for each determination.

Embodiments of the invention are described herein in the context of transactions accessing a copy of a data block that contains a set of one or more data items. However, the approach described herein is not dependent upon the use of data items or data blocks. Hence, the approach described herein is applicable to determining whether a transaction in a database system can use a copy of any type of data.

DETAILED DESCRIPTION

Figure 1:
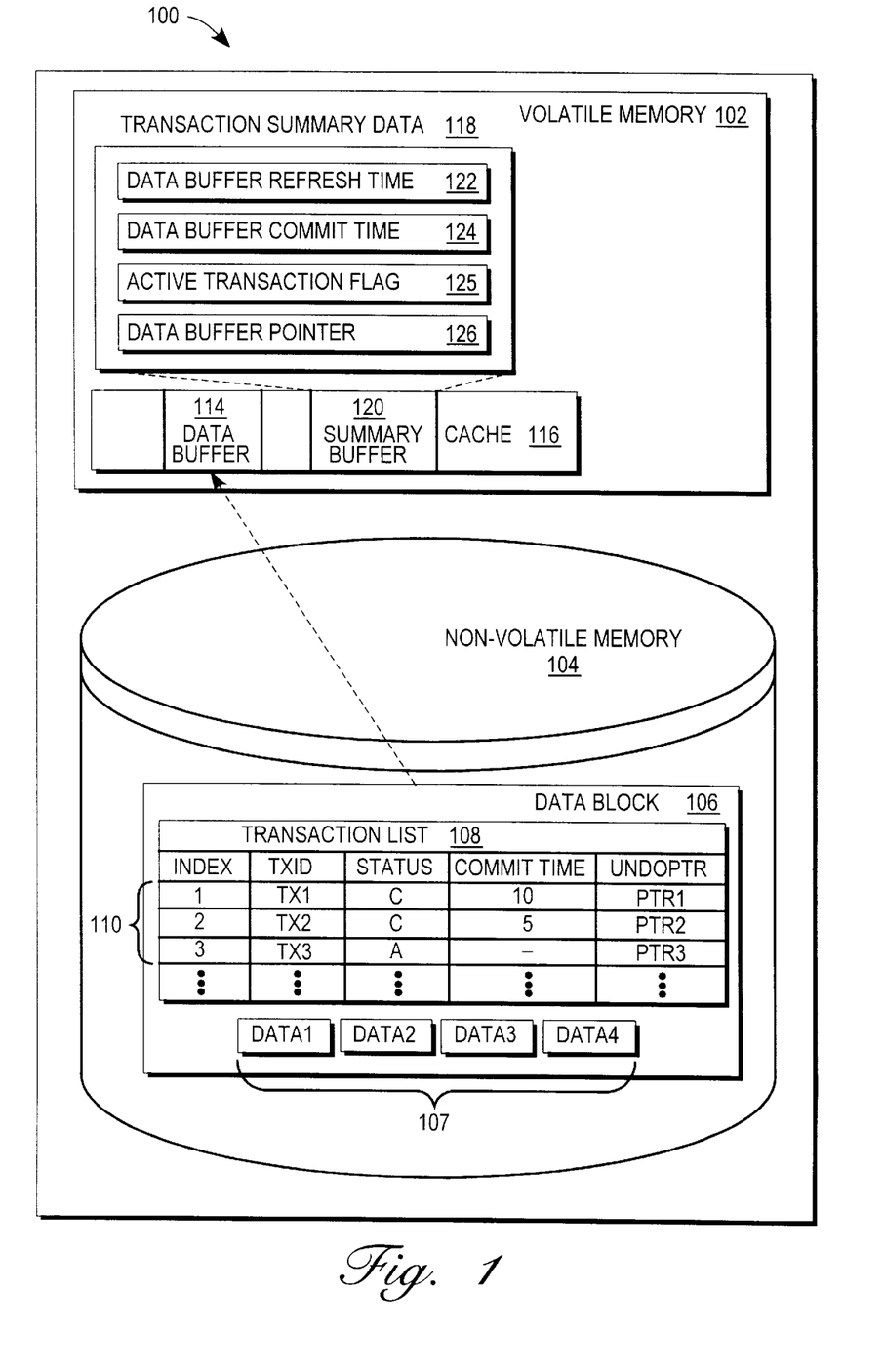
FIG. 1 is a block diagram of a database system for determining whether a transaction can use a version of data according to an embodiment of the invention.

FIG. 1 is a block diagram of a database system 100 that uses data buffer refresh times and data buffer commit times for determining whether a transaction can use a particular version of a data item according to an embodiment of the invention. Database system 100 includes a volatile memory 102 and non-volatile memory 104. Non-volatile memory 104 generally represents one or more storage devices, such as magnetic or optical drives, on which a database is stored. A data block 106 is stored on non-volatile memory 104 and contains one or more data items 107. In the illustrated embodiment, data items 107 are identified individually as DATA1, DATA2, DATA3 and DATA4.

TRANSACTION LISTS

Data block 106 also contains a transaction list 108 that contains information about transactions that have operated on data items 107. As illustrated, transaction list 108 contains entries 110 that corresponds to transactions that have operated on data item 107.

Each of the entries 110 includes an index number INDEX, a transaction identifier TXID, a status flag STATUS, a commit time COMMIT TIME and an undo pointer UNDOPTR. Each index number INDEX uniquely identifies one of the entries 110. Each transaction identifier TXID identifies a transaction associated with the corresponding entry 110. The status flag STATUS indicates whether the transaction that corresponds to the entry is active, i.e. "A," or has committed, i.e. "C." The commit time COMMIT TIME indicates the commit time of the transaction that corresponds to the entry 110. The undo pointer UNDOPTR points to an undo record (not illustrated) that indicates how to undo the most recent change made to the data block by the transaction that corresponds to the entry 110. Thus, transaction list 108 always indicates the most recently committed transaction to update data block 106 as well as any transactions that have updated data block 106 but which have not yet committed. For example, entries 110 indicate that transactions TX1 and TX2 committed at times 10 and 5, respectively, while transaction TX3 has not yet committed.

When a transaction requires access to data contained in data block 106, a copy of data block 106 is loaded into a data buffer 114, in a cache 116, in volatile memory 102. The transaction then accesses the copy of data block 106 stored in data buffer 114. Database system 100 may reconstruct an earlier version of the data contained in data block 106 by applying one or more undo records to the copy of data block 106 stored in data buffer 114. The application of the undo records removes changes from the copy of data block 106 located in data buffer 114, effectively reconstructing a previous version of the data block 106.

TRANSACTION SUMMARY DATA

Volatile memory 102 also includes transaction summary data 118 that is generated for the copy of data block 106 that is stored in buffer 114 according to an embodiment of the invention. Transaction summary data 118 includes a data buffer refresh time 122, a data buffer commit time 124, an active transaction flag 125 and a data buffer pointer 126.

Data buffer refresh time 122 specifies the time at which all changes made to the copy of data block 106 in data buffer 114 are current. In other words, all changes made to data block 106 equal to or prior to data buffer refresh time 122 are reflected in the copy of data block 106 in data buffer 114. The initial value for the data buffer refresh time 122 is obtained from data block 106 when the copy of data block 106 is loaded into data buffer 114.

Data buffer commit time 124 specifies the commit time of the most recently committed transaction that updated any of data items 107. When the copy of data block 106 is initially loaded into data buffer 114, entries 110 are examined to identify the commit time of the most recently committed transaction that updated data items 107. This commit time is saved as the initial data buffer commit time 124. Data buffer commit time 124 may also be initialized with a predetermined value, such as a NULL value, before entries 110 are scanned, to indicate that entries 110 have not yet been examined. As transactions that have updated the copies of data items 107 that reside in data buffer 114 commit, data buffer commit time 124 is updated to reflect the commit time of the most recently committed transaction that updated data items 107.

Active transaction flag 125 indicates whether, at the time the copy of data block 106 in data buffer 114 was created, any transactions had operated on data items 107 and were still active and uncommitted.

As with data buffer commit time 124, when the copy of data block 106 is initially loaded into data buffer 114, entries 110 are examined to determine whether any transactions that have operated on data items 107 are active. This may be done by examining the STATUS column of transaction list 108 to see if any transactions have a status of "A" to indicate active. If so, then active transaction flag 125 is set, for example by setting active transaction flag 125 to a predetermined value.

Data buffer pointer 126 contains a value that indicates the location of the data with which the summary table data 118 is associated. In the present example, summary table data 118 is associated with the copy of data block 106 that resides in data buffer 114. Therefore, data buffer pointer 126 points to buffer 114.

USING TRANSACTION SUMMARY DATA

The transaction summary data associated with a particular data buffer defines a time range that corresponds to the state of the data items within the particular data buffer. If a transaction needs to see a data block as it existed within the range of times defined by the transaction summary data, then the version of data block 106 stored in the data buffer pointed to by the transaction summary data can be used by the transaction. Within the transaction summary data, data buffer refresh time 122 defines the high end of the range, while data buffer commit time 124 defines the low end of the range.

For example, transaction summary data 118 associated with data buffer 114 defines a time range that corresponds to the state of the data items within data buffer 114. Within the transaction summary data 118, data buffer refresh time 122 defines the high end of the range, while data buffer commit time 124 defines the low end of the range. Thus, if data buffer refresh time 122 is T33 and data buffer commit time 124 is T24, then data buffer 114 contains a version of data block 106 that reflects the state of data block 106 between times T24 and T33. If a transaction needs to see data block 106 as it existed between times T24 and T33, then the version of data block 106 stored in data buffer 114 can be supplied to the transaction.

To determine whether a transaction can use a version of a data item, the snapshot time being used by the transaction is compared to the value of the data buffer refresh time 122. If the snapshot time being used by the transaction is later than the value of the data buffer refresh time 122, then the version of data block 106 in data buffer 114 is not new enough and cannot be used.

If the snapshot time being used by the transaction is the same as or earlier than the value of data buffer refresh time 122, then the snapshot time is compared to the value of data buffer commit time 124. If the snapshot time being used by the transaction is equal to or later than the value of data buffer commit time 124, then the results of all transactions that committed before the snapshot time are reflected in the copy of data block 106 in data buffer 114.

If the active transaction flag 125 is not asserted, then, at the time the copy of data block 106 was created in data buffer 114, all transactions that operated on the data were committed. If the active transaction flag 125 is set, then the copy of data block 106 in data buffer 114 cannot be used because it may contain changes that cannot be seen by the transaction.

When the snapshot time being used by a transaction is both equal to or later than the buffer commit time 124 and equal to or earlier than the buffer refresh time 122, and the active transaction flag 125 is not set, the copy of data block 106 in data buffer 114 can be used by the transaction because the copy of data block 106 in data buffer 114 reflects all changes made by transactions that committed at or before the snapshot time of the transaction and does not reflect any changes made by transactions that committed after the snapshot time used by the transaction.

If the snapshot time being used by the transaction is later than the data buffer refresh time 122, then it is possible that data buffer 114 does not contain a change that must be seen by the transaction. If the snapshot time being used by the transaction is earlier than the data buffer commit time 124, then data buffer 114 contains a change that cannot be seen by the transaction. In either case, the version of data block 106 stored in the data buffer 114 cannot be supplied to the transaction without further processing. Under these conditions, a different version of data block 106 stored elsewhere in cache 116 may be supplied, or may be loaded into cache 116 from non-volatile memory 104.

If the snapshot time being used by the transaction is later than the data buffer refresh time, the data buffer 114 may be "refreshed" by determining whether any updates have been made to data block 106 after the data buffer refresh time 122. If no changes have been made to data block 106 between data buffer refresh time 122 and the current time, then data buffer refresh time 122 is updated to the current time, and the version of data block 106 within data buffer 114 may be supplied to the transaction.

If data buffer 114 contains changes that cannot be seen by the transaction, then the appropriate version of data block 106 may be reconstructed from the version currently stored in data buffer 114 by using undo records to remove or "roll back" the changes in data buffer 114 that were made by transactions that have a commit time after the snapshot time.

As mentioned above, the data buffer commit time associated with a buffered copy of a data block is initially determined based on an inspection of the transaction list within the copy of the data block that is located on non-volatile memory. The overhead associated with inspecting the transaction list of a block on non-volatile memory is significant due to the relatively slow access rate of non-volatile memory devices, such as disks. This inspection of the transaction list may be performed at the time a copy of the data block is loaded into volatile memory, or the first time the database system needs to determine whether the non-volatile copy can be used for a transaction.

However, once the inspection has been performed and the initial value of the data buffer commit time is established, the on-disk transaction list need not be inspected to determine whether subsequent transactions can use the copy of data block stored in the buffer. Thus, for subsequent determinations as to whether the copy of data block 106 that is stored in data buffer 114 can be used by a transaction, transaction list 108 need not be inspected. Instead, the transaction summary data 118 that is maintained in volatile memory 102, is used as described herein.

Figure 2:
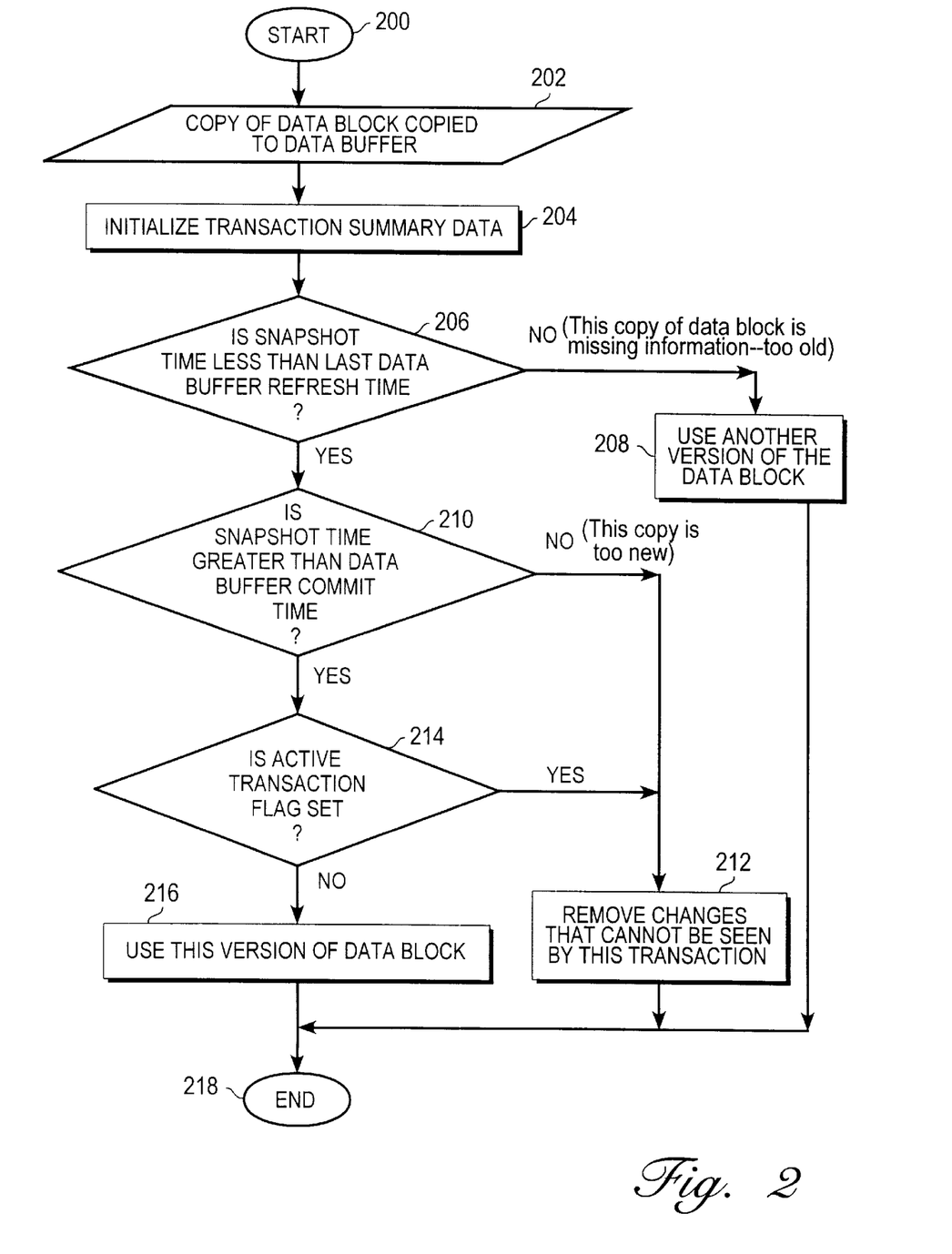
FIG. 2 is a flow chart illustrating a method for determining whether a transaction in a database system can use a version of data according to an embodiment of the invention.

The method for determining whether a transaction can use a version of a data item according to an embodiment of the invention is now described with reference to the flow chart of FIG. 2. The process starts at step 200. In step 202, a copy of data block 106 is written to data buffer 114. Typically, the action of loading a copy of a data block into a data buffer is performed in response to a transaction requesting one or more data items within the data block.

In step 204, transaction summary data 118 is initialized. Data buffer refresh time 122 is initialized to a time at which the copy of data block 106 is written to data buffer 114. Data buffer commit time 124 is initialized to a commit time of the most recently committed transaction that updated any of data items 107. This determined by examining entries 110 in transaction list 108. However, as previously described, entries 110 only need to be examined when the transaction summary data 118 is initialized. The value for active transaction flag 125 is also set based upon the examination of entries 110. If any entry in entries 110 contains a STATUS of "A", active transaction flag 125 is set. Otherwise, a predetermined value is loaded into active transaction flag 125 to indicate that active transaction flag 125 is not set. Finally, data buffer pointer 126 is initialized to point (reference) the copy of data block 106 stored in data buffer 114.

In step 206 a determination is made as to whether the snapshot time used by a transaction that requires access to data block 106 is equal to or earlier than data buffer refresh time 122. If not, then the transaction cannot use this version of data go block 106 because the version is too old and may be missing changes made after the data buffer refresh time that must be seen by the transaction. Under these conditions, control proceeds to step 208 and another version of data block 106 is used.

If on the other hand, in step 206 the snapshot time being used by the transaction is equal to or earlier data buffer refresh time, then in step 210, a determination is made as to whether the snapshot time is equal to or later than data buffer commit time 124. If the snapshot time is not equal to or later than data buffer commit time 124, then the version of data block 106 in data buffer 114 is too new and contains changes that cannot be seen by the transaction, and therefore cannot be used. Instead, in step 212 the changes that cannot be seen by the transaction are removed, for example by undoing or rolling back the changes. As previously discussed, the changes may be removed by applying undo records. If in step 210 the snapshot time is greater than the data buffer commit time, then in step 214 a determination is made whether the active transaction flag 125 is set. If so, then the version of data block 106 in data buffer 114 is too new and contains changes that cannot be seen by transaction and therefore cannot be used. Again, in step 212, the changes that cannot be seen by the transaction are removed. If the active transaction flag 125 is not set, then in step 216, the version of data block 106 in data buffer 114 can be used. Finally, the process is complete in step 214.

Note that transaction summary data 118 needs to be initialized in step 206 only once. For subsequent requests for items in data block 106, transactions need only compare their snapshot time to the data maintained in transaction summary data 118 for buffer 114 to determine whether they can use the version of data block 106 stored in buffer 114. Also, as previously described, data buffer commit time 124 is updated as transactions that modify data items 107 in the copy of data block 106 that resides in buffer 114 commit.

Although embodiments of the invention have been described in the context of the data items 107 containing four items, namely DATA1, DATA2, DATA3 and DATA4, any number of data items may be used. In addition, the data items may be stored on more than one data block or in other types of "data containers." For example, data items 107 may be stored on two data blocks, in which case transaction summary data 118 would be associated with both data blocks.

In addition, although embodiments of the invention have been described in the context of a single snapshot times for transactions, a snapshot range may also be used. For example, instead of a single snapshot time, a transaction may have associated MUST SEE and CANNOT SEE times. The transaction must see all changes made by any transaction that has a commit time at or earlier then the MUST SEE time. In addition, the transaction cannot see any changes made by transaction having a commit time at or later than the CANNOT SEE time.

The MUST SEE and CANNOT SEE times effectively define a dependency range for a transaction. For a transaction to use a copy of data block 106 stored in data buffer 114, the MUST SEE time of the transaction is compared to data buffer refresh time 122 and the CANNOT SEE time of the transaction is compared to the data buffer commit time 124. If the MUST SEE time is less than the data buffer refresh time 122 and the CANNOT SEE time is greater than the data buffer commit time 124, then the version of data block 106 in data buffer 114 can be used by the transaction.

HARDWARE OVERVIEW

Figure 3:
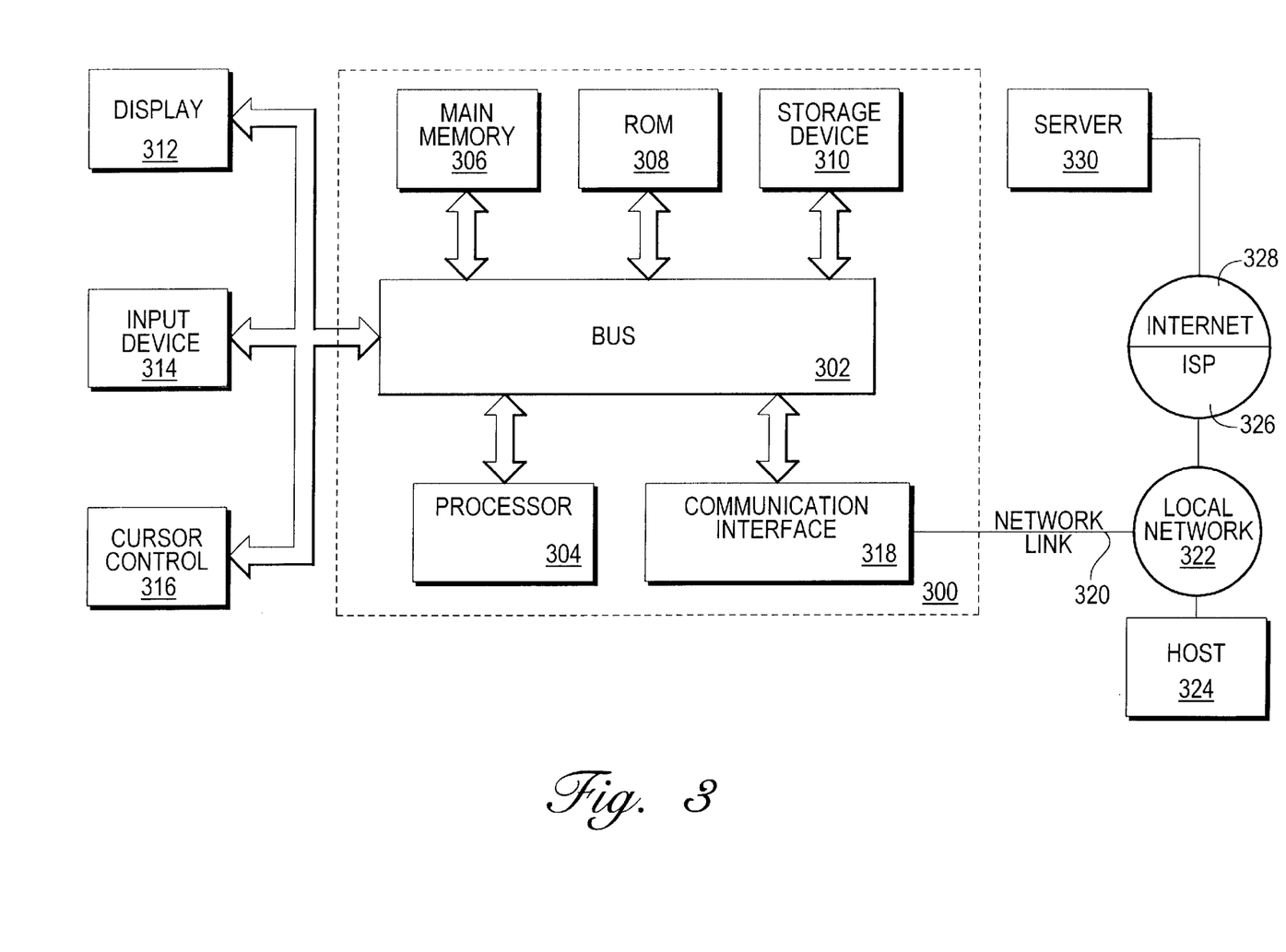
FIG. 3 is a block diagram of a computer system on which embodiments of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for determining whether a transaction can use a version of a data item. According to one embodiment of the invention, determining whether a transaction can use a version of a data item is provided by computer system 300 in response to processor 304 executing sequences of instructions contained in main memory 306. Such instructions may be read into main memory 306 from another computer-readable medium, such as storage device 310. Execution of the sequences of instructions contained in main memory 306 causes processor 304 to perform the process steps described herein. Multi-processing arrangements may be used in place of processor 304 to perform the process steps.

In alternative embodiments, hard-wired circuitry may be used in place of or in combination with software instructions to implement the invention. Thus, embodiments of the invention are not limited to any specific combination of hardware circuitry and software. In addition, multi-processor systems may be employed in place of processor 304.

The term "computer-readable medium" as used herein refers to any medium that participates in providing instructions to processor 304 for execution. Such a medium may take many forms, including but not limited to non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying sequences of instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector coupled to bus 302 can receive the data carried in the infra-red signal and place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the invention, one such downloaded application provides for determining whether a transaction can use a version of a data item.

The received code may be executed by processor 304 as it is received, and/or stored in storage device 310, or other non-volatile storage for later execution. In this manner, computer system 300 may obtain application code in the form of a carrier wave.

The invention provides several advantages over prior approaches for determining whether a transaction can use a copy of a data block. Once the transaction summary information has been generated and updated to reflect the copy of the data block stored in non-volatile memory, the transaction summary information can be examined to determine whether transactions can use the copy of the data block. Examining the transaction summary information can require significantly fewer system resources than examining transaction list entries for several reasons. First, using the transaction summary data to determine whether a transaction can use a copy of a data block only requires examining two values: the data buffer refresh time and the data buffer commit time, while a transaction list may contain thousands of entries. Second, the transaction summary data can be stored in volatile memory such as RAM, which usually requires fewer system resources and less time to access than a non-volatile storage, such as a disk, where a transaction list containing a large number of entries is typically maintained. The use of relatively fewer resources and less time can significantly improve data concurrency, a major concern in database systems.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for determining whether a version of data should be provided to
   a first transaction, the method comprising the steps of:
   generating transaction data associated with one or more transactions that have updated the version of data, the transaction data indicating commit times of the one or more transactions that have committed after updating the version of data;
   generating transaction summary data based upon the transaction data, the transaction summary data indicating a latest time at which the version of data is guaranteed to be current, the transaction summary data further indicating a commit time of a most recently committed transaction of the one or more transactions that committed after updating the version of data;
   after generating the transaction summary data, refreshing said transaction summary data by modifying the data that indicates the latest time at which the version of data is guaranteed to be current;
   wherein the step of refreshing is performed without modifying the data that indicates the commit time of the most recently committed transaction if no transaction that has updated the version of data has committed between performance of the step of generating the transaction summary data and performance of the step of refreshing; and
   determining, based upon the transaction summary data and a snapshot time used by the first transaction, whether the version of data is to be provided to the first transaction.

2. The method of claim 1, wherein the step of determining, based upon the transaction summary data and a snapshot time used by the first transaction, whether the version of data is to be provided to the first transaction, includes the steps of:
   comparing the snapshot time used by the first transaction to the commit time of the most recently committed transaction of the one or more transactions that committed after updating the version of data,
   comparing the snapshot time used by the first transaction to the latest time at which the version of data is guaranteed to be current, and
   if the snapshot time used by the first transaction is both equal to or later than the commit time of the most recently committed transaction of the one or more transactions that committed after updating the version of data, and equal to or earlier than the latest time at which the version of data is guaranteed to be current, then providing the version of data to the first transaction.

3. The method of claim 1, further including the step of determining, based upon the transaction summary data and a snapshot time used by a second transaction, whether the version of data is to be provided to the second transaction.

4. The method of claim 3, wherein the step of determining, based upon the transaction summary data and a snapshot time used by the second transaction, whether the version of data is to be provided to the second transaction, includes the steps of:
   comparing the snapshot time used by the second transaction to the commit time of the most recently committed transaction of the one or more transactions that committed after updating the version of data,
   comparing the snapshot time used by the second transaction to the latest time at which the version of data is guaranteed to be current, and
   if the snapshot time used by the first transaction is both equal to or later than the commit time of the most recently committed transaction of the one or more transactions that committed after updating the version of data, and equal to or earlier than the latest time at which the version of data is guaranteed to be current, then providing the version of data to the second transaction.

5. The method of claim 1, further including the step of updating the transaction summary data to indicate the commit time of a new transaction that committed after updating the version of data, wherein the commit time of the new transaction is later than the commit time of the one or more transactions.

6. The method of claim 1, wherein the step of generating transaction summary data based upon the transaction data includes the step of examining the transaction data to determine the commit time of the most recently committed of the one or more transactions that committed after updating the version of data.

7. The method of claim 1, wherein the step of generating transaction summary data based upon the transaction data includes the step of establishing an active transaction flag based on whether any transactions that have updated the version of data were active when the transaction summary data was generated.

8. A method for determining whether a version of data should be provided to a transaction, the method comprising the steps of:
   generating transaction summary data based upon the transaction data, wherein the transaction summary data includes a data buffer refresh time and a data buffer commit time, the data buffer refresh time indicating a latest time at which the version of data is guaranteed to be current;
   the data buffer commit time being indicative of a commit time of a most recently committed transaction that committed after updating the version of data;

after generating the transaction summary data, refreshing said transaction summary data by modifying the data buffer refresh time;

wherein the step of refreshing is performed without modifying the data buffer commit time if no transaction that has updated the version of data has committed between performance of the step of generating the transaction summary data and performance of the step of refreshing;

comparing a snapshot time used by the transaction to both the data buffer refresh time and the data buffer commit time; and if the snapshot time for the transaction is both equal to or earlier than the data buffer refresh time and equal to or later than the data buffer commit time then providing the version of data to the transaction.

9. A computer-readable medium carrying one or more sequences of one or more instructions for determining whether a version of data should be provided to a first transaction, the one or more sequences of one or more instructions including instructions which, when executed by one or more processors, cause the one or more processors to perform the steps of:

generating transaction data associated with one or more transactions that have updated the version of data, the transaction data indicating commit times of the one or more transactions that have committed after updating the version of data;

generating transaction summary data based upon the transaction data, the transaction summary data indicating a latest time at which the version of data is guaranteed to be current, the transaction summary data further indicating a commit time of a most recently committed transaction of the one or more transactions that committed after updating the version of data;

after generating the transaction summary data, refreshing said transaction summary data by modifying the data that indicates the latest time at which the version of data is guaranteed to be current;

wherein the step of refreshing is performed without modifying the data that indicates the commit time of the most recently committed transaction if no transaction that has updated the version of data has committed between performance of the step of generating the transaction summary data and performance of the step of refreshing; and determining, based upon the transaction summary data and a snapshot time used by the first transaction, whether the version of data is to be provided to the first transaction.

10. The computer-readable medium of claim 9, wherein the step of determining, based upon the transaction summary data and a snapshot time used by the first transaction, whether the version of data is to be provided to the first transaction, includes the steps of:

comparing the snapshot time used by the first transaction to the commit time of the most recently committed transaction of the one or more transactions that committed after updating the version of data, comparing the snapshot time used by the first transaction to the latest time at which the version of data is guaranteed to be current, and if the snapshot time used by the first transaction is both equal to or later than the commit time of the most recently committed transaction of the one or more transactions that committed after updating the version of data, and equal to or earlier than the latest time at which the version of data is guaranteed to be current, then providing the version of data to the first transaction.

11. The computer-readable medium of claim 9, further including the step of determining, based upon the transaction summary data and a snapshot time used by a second transaction, whether the version of data is to be provided to the second transaction.

12. The computer-readable medium of claim 11, wherein the step of determining, based upon the transaction summary data and a snapshot time used by the second transaction, whether the version of data is to be provided to the second transaction, includes the steps of:

comparing the snapshot time used by the second transaction to the commit time of the most recently committed transaction of the one or more transactions that committed after updating the version of data, comparing the snapshot time used by the second transaction to the latest time at which the version of data is guaranteed to be current, and if the snapshot time used by the first transaction is both equal to or later than the commit time of the most recently committed transaction of the one or more transactions that committed after updating the version of data, and equal to or earlier than the latest time at which the version of data is guaranteed to be current, then providing the version of data to the second transaction.

13. The computer-readable medium of claim 9, further including the step of updating the transaction summary data to indicate the commit time of a new transaction that committed after updating the version of data, wherein the commit time of the new transaction is later than the commit time of the one or more transactions.

14. The computer-readable medium of claim 9, wherein the step of generating transaction summary data based upon the transaction data includes the step of examining the transaction data to determine the commit time of the most recently committed of the one or more transactions that committed after updating the version of data.

15. A computer system for determining whether a version of data should be provided to a first transaction, the computer system comprising:

one or more processors; and a memory coupled to the one or more processors and containing one or more sequences of one or more instructions which, when executed by the one or more processors, cause the one or more processors to perform the steps of generating transaction data associated with one or more transactions that have updated the version of data, the transaction data indicating commit times of the one or more transactions that have committed after updating the version of data, generating transaction summary data based upon the transaction data, the transaction summary data indicating a latest time at which the version of data is guaranteed to be current, the transaction summary data farther indicating a commit time of a most recently committed transaction of the one or more transactions that committed after updating the version of data, after generating the transaction summary data, refreshing said transaction summary data by modifying the data that indicates the latest time at which the version of data is guaranteed to be current;

wherein the step of refreshing is performed without modifying the data that indicates the commit time of the most recently committed transaction if no transaction that has updated the version of data has committed between performance of the step of generating the transaction summary data and performance of the step of refreshing; and determining, based upon the transaction summary data and a snapshot time used by the first transaction, whether the version of data is to be provided to the first transaction.

16. The computer system of claim 15, wherein the step of determining, based upon the transaction summary data and a snapshot time used by the first transaction, whether the version of data is to be provided to the first transaction, includes the steps of:

comparing the snapshot time used by the first transaction to the commit time of the most recently committed transaction of the one or more transactions that committed after updating the version of data, comparing the snapshot time used by the first transaction to the latest time at which the version of data is guaranteed to be current, and if the snapshot time used by the first transaction is both equal to or later than the commit time of the most recently committed transaction of the one or more transactions that committed after updating the version of data, and equal to or earlier than the latest time at which the version of data is guaranteed to be current, then providing the version of data to the first transaction.

17. The computer system of claim 15, further including the step of determining, based upon the transaction summary data and a snapshot time used by a second transaction, whether the version of data is to be provided to the second transaction.

18. The computer system of claim 17, wherein the step of determining, based upon the transaction summary data and a snapshot time used by the second transaction, whether the version of data is to be provided to the second transaction, includes the steps of:

comparing the snapshot time used by the second transaction to the commit time of the most recently committed transaction of the one or more transactions that committed after updating the version of data, comparing the snapshot time used by the second transaction to the latest time at which the version of data is guaranteed to be current, and if the snapshot time used by the first transaction is both equal to or later than the commit time of the most recently committed transaction of the one or more transactions that committed after updating the version of data, and equal to or earlier than the latest time at which the version of data is guaranteed to be current, then providing the version of data to the second transaction.

19. The computer system of claim 15, further including the step of updating the transaction summary data to indicate the commit time of a new transaction that committed after updating the version of data, wherein the commit time of the new transaction is later than the commit time of the one or more transactions.

20. The computer system of claim 15, wherein the step of generating transaction summary data based upon the transaction data includes the step of examining the transaction data to determine the commit time of the most recently committed of the one or more transactions that committed after updating the version of data.

21. A method for determining whether a version of data should be provided to a transaction, the method comprising the step of:

generating time range data that indicates a time range associated with the version of data, the time range being defined by both a latest time at which the version of data is guaranteed to be current and a commit time of a most recently committed transaction of one or more transactions that committed after updating the version of data;

after generating the time range data, refreshing said time range data by modifying the latest time at which the version of data is guaranteed to be current;

wherein the step of refreshing is performed without modifying the commit time of the most recently committed transaction if no transaction that has updated the version of data has committed between performance of the step of generating the time range data and performance of the step of refreshing; and comparing a snapshot time being used by the transaction with said time range data.

22. A computer-readable medium method for determining whether a version of data should be provided to a transaction, the computer-readalbe medium carrying one or more sequences of one or more insturctions which, when executed by one or more processors, cause the one or more processors to perform the steps of:

generating transaction summary data based upon the transaction data, wherein the transaction summary data includes a data a buffer refresh time and a data buffer commit time, the data buffer refresh time indicating a latest time at which the version of data is guaranteed to be current;

the data buffer commit time being indicative of a commit time of most recently committed transaction that committed after updataing the version of data;

after generating the transaction summary data, refreshing said transaction summary data by modifying the data buffer refresh time;

wherein the step of refreshing is performed without modifying the data buffer commit time if no transaction that has updated the version of data has committed between performance of the step of generating the transaction summary data and performance of the step of refreshing;

comparing a snapshot time used by the transaction is both equal to or earlier than the data buffer refresh tiem and equal to or later than the data buffer commit time then providing the version of data to the transaction.

23. A computer system for determining whether a version of data should be provided to a trasaction, the computer system comprising:

one or more processors; and a memory communicatively coupled to the one or more processors, the memory including one or more sequences of one or more instructions which, when exected by the one or more processors, cause the one or more processors to perform the steps of generating transaction summary data based upon the transaction data, wherein the transaction summary data includes a data buffer refresh time and a data buffer commit time, the data buffer refresh time indicating a latest time at which the version of data is guaranteed to be current;

the data buffer commit time being indicative of a commit time of a most recently committed transaction that committed after updataing the version of data;

after generating the transaction summary data, refreshing said transaction summary data by modifying the data buffer refresh time;

wherein the step of refreshing is performed without modifying the data buffer commit time if nno transaction that has updated the version of data has committed between performance of the step of generating the transaction summary data and performance of the step of refreshing;

comparing a snapshot time used by the transaction to both the data buffer refresh time and the data buffer commit time; and if the snapshot time for the transaction is both equal to or earlier than the data buffer refresh time and equal to or later than the data buffer commit time then providing the version of data to the transaction.

24. A computer-readable medium for determining whether a version of data should be provided to a transaction, the computer-readable medium carrying one or more sequences of one or more instructions which, when executed by one or more processors, cause the one or more processors to perform the steps of:

generating time range data that indicates a time ranged associated with the version of data, the time range being defined by both a latest time at which the version of data is guaranteed to be current and a commit time of a most recently committed transaction of one or more transactions that committed after updating the version of data;

after generating the time range data, refreshing said time range data, refreshing said time range data by modifying the latest time at which the version of data is guaranteed to be current;

wherein the step of refreshing is performed without modifying the commit time of the most recently committed transaction if no transaction that has updated the version of data has committed between performance of the step of generating the time range data and performance of hte step of refreshing; and comparing a snapshot time being used by the transaction with said time range data.

25. A computer system for determining whether a version of data should be provided to a transaction, the computer system comprising:

one or more processors; and a memory co;mmunicatively coupled to the one or more processors, the memory including one or more sequences of one or more instructions which, when executed by the one or more processors, cause the one or more instructions which, when perform the steps of generating time range data that indicates a time range associated with the version of data, the tiem range being defined by both a latest tiem at which the version of data is guaranteed to be current and a commit time of a most recently committed after updating the version of data;

after generating the time range data, refreshing said time range data by modifying the latest time at whcih the version fo data is guaranteed to be current;

wherein the step of refreshing is performed without modifying the commit tiem of the most recently committed transaction if no transaction that has updated the version of data has committed between performance of the step of generating the time range data and performance of the step of refreshing; and comparing a snapshot time being used by the transaction with said time range data.

\* \* \* \* \*

UNITED STATES PATENT AND TRADEMARK OFFICE
CERTIFICATE OF CORRECTION

PATENT NO.  : 6,192,377 B1
DATED       : February 20, 2001
INVENTOR(S) : Amit Ganesh, et al.

It is certified that error appears in the above-identified patent and that said Letters Patent is hereby corrected as shown below:

Claims,
Claim 22, column 18,
Lines 49-52, replace "is both equal to or earlier than the data buffer refresh tiem and equal to or later than the data buffer commit time then providing the version of data to the transaction" with -- to both the data buffer refresh time and the data buffer commit time; and if the snapshot time for the transaction is both equal to or earlier than the data buffer refresh time and equal to or later than the data buffer commit time then providing the version of data to the transaction --.

Claim 23, column 18,
Line 60, replace "exected" with -- executed --.

Claim 23, column 19,
Line 8, replace "nno" with -- no --.

Claim 24, column 20,
Line 6, replace "hte" with -- the --.

Claim 25, column 20,
Line 14, replace "co;mmunicatively" with -- communicatively --.
Line 18, replace "instructions which, when" with -- processors to --.
Line 20, replace "tiem" with -- time --.
Line 21, replace "tiem" with -- time --.
Line 26, replace whcih" with -- which --.
Line 27, replace "fo" with -- of --.
Line 29, replace "tiem" with -- time --.

Signed and Sealed this

Sixteenth Day of October, 2001

*Attest:*

NICHOLAS P. GODICI
*Attesting Officer*  Acting Director of the United States Patent and Trademark Office

UNITED STATES PATENT AND TRADEMARK OFFICE
CERTIFICATE OF CORRECTION

PATENT NO. : 6,192,377 B1
DATED : February 20, 2001
INVENTOR(S) : Amit Ganesh et al.

It is certified that error appears in the above-identified patent and that said Letters Patent is hereby corrected as shown below:

<u>Title page, Item [54] Column 1, lines 1-3,</u>
Title, replace "METHOD AND APPARATUS FOR DETERMING WHETHER A TRANSACTION CAN USE A VERSION OF A DATA ITEM" with -- METHOD AND APPARATUS FOR DETERMINING WHETHER A TRANSACTION CAN USE A VERSION OF A DATA ITEM --.

Signed and Sealed this

Twenty-second Day of February, 2005

JON W. DUDAS
*Director of the United States Patent and Trademark Office*